(12) United States Patent
Milbert

(10) Patent No.: US 7,756,635 B2
(45) Date of Patent: Jul. 13, 2010

(54) METHOD AND SYSTEM FOR GENERATING AND PRESENTING OFF-ROAD TRAVEL ROUTES

(75) Inventor: Randy L. Milbert, Saint Paul, MN (US)

(73) Assignee: Primordial, Inc., Saint Paul, MN (US)

( * ) Notice: Subject to any disclaimer, the term of this patent is extended or adjusted under 35 U.S.C. 154(b) by 1365 days.

(21) Appl. No.: 11/205,042

(22) Filed: Aug. 17, 2005

(65) Prior Publication Data

US 2006/0116814 A1  Jun. 1, 2006

Related U.S. Application Data

(63) Continuation of application No. 10/409,832, filed on Apr. 9, 2003, now Pat. No. 6,963,800.

(51) Int. Cl.
*G01C 21/00* (2006.01)

(52) U.S. Cl. ................ 701/209; 701/210; 701/211

(58) Field of Classification Search ......... 701/200–202, 701/207–211; 340/988
See application file for complete search history.

(56) References Cited

U.S. PATENT DOCUMENTS

| | | | |
|---|---|---|---|
| 2,399,425 A | 4/1946 | Bradley | |
| 4,947,350 A | 8/1990 | Murray et al. | |
| 4,954,958 A | 9/1990 | Savage et al. | |
| 5,187,667 A | 2/1993 | Short | |
| 5,326,265 A | 7/1994 | Prevou | |
| 5,612,882 A | 3/1997 | LeFebvre et al. | |
| 5,787,233 A | 7/1998 | Akimoto | |
| 5,838,262 A | 11/1998 | Kershner et al. | |
| 5,850,617 A | 12/1998 | Libby | |
| 6,144,318 A | 11/2000 | Hayashi et al. | |
| 6,182,007 B1 | 1/2001 | Szczerba | |
| 6,259,988 B1 * | 7/2001 | Galkowski et al. | 701/202 |
| 6,298,302 B2 | 10/2001 | Walgers et al. | |
| 6,317,684 B1 | 11/2001 | Roeseler et al. | |
| 6,401,038 B2 | 6/2002 | Gia | |
| 6,433,729 B1 * | 8/2002 | Staggs | 342/29 |
| 6,498,982 B2 | 12/2002 | Bellesfield et al. | |
| 6,963,800 B1 | 11/2005 | Milbert | |

* cited by examiner

*Primary Examiner*—Yonel Beaulieu
(74) *Attorney, Agent, or Firm*—Carlos R. Villamar; The Villamar Firm PLLC

(57) ABSTRACT

A computer-implemented method for generating and presenting off-road travel routes based on terrain and obstruction analysis. The method includes a Threat Analyzer (100) for assessing threats that may impede progress, a Graph Builder (102) for constructing a graph representing an individual's environment, a Route Generator (104) for generating a route that avoids the threats, and a Route Presenter (106) for guiding the individual along the route. The Threat Analyzer (100) includes an Obstruction Analyzer (202) for detecting obstructions in aerial imagery. The Graph Builder (102) includes a Cost Evaluator (712) that takes into account traversal speeds for individuals across various types of terrain. The Route Presenter (106) overlays the route on aerial imagery and provides real-time guidance as the individual traverses the route.

5 Claims, 7 Drawing Sheets

METHOD AND SYSTEM FOR GENERATING AND PRESENTING OFF-ROAD TRAVEL ROUTES

CROSS-REFERENCE TO RELATED APPLICATIONS

This application is a continuation of U.S. patent application Ser. No. 10/409,832, filed Apr. 9, 2003, now allowed, incorporated by reference herein.

BACKGROUND OF INVENTION

1. Field of the Invention

This invention relates to navigation, specifically to generating and presenting off-road travel routes based on terrain and obstruction analysis.

2. Discussion of the Background

On 1993 Oct. 3, U.S. Army Rangers raided a compound in Mogadishu, Somalia. The U.S. was responding to seizures of humanitarian supplies by the warlord, General Mohamed Aideed. During the raid, General Aideed's forces fired a surface-to-air missile, downing a U.S. Blackhawk helicopter. As a result, U.S. Army commanders redirected foot soldiers and Humvee convoys to aid the injured pilots.

With bullets whizzing and enemy forces closing in on the helicopter's debris, commanders relied on paper maps and surveillance video to generate routes to the injured pilots. The commanders radioed turn-by-turn directions to the soldiers only to discover that many roads along the routes were impassable due to enemy obstructions overlooked in the frenzy. In the ensuing battle—lasting fewer than 24 hours—the U.S. lost two more Blackhawk helicopters and suffered 18 casualties.

A computer-implemented battlefield navigation system would have accelerated the rescue mission and reduced casualties. Such a system would route soldiers around enemy attacks and battlefield obstructions. In addition, the battlefield navigation system would relieve commanders from issuing turn-by-turn directions, enabling them to focus on mission strategy.

Unfortunately, prior to the present invention, no such battlefield navigation system existed. The U.S. Army's latest system for soldiers—the Land Warrior—is limited to simple messaging and map display capabilities. The process of generating routes and guiding soldiers on the battlefield remains tedious and time-consuming.

Inventors have devised, however, a number of systems that serve as a foundation for a battlefield navigation system. These systems are described below.

General-Purpose Navigation Systems

The first navigation systems solved the general problem of representing road networks as graphs, finding the shortest path between source and destination nodes, and presenting the route to an operator. Several patents disclose general-purpose navigation systems. For example:

U.S. Pat. No. 4,954,958 to Savage et al. (1990) discloses a system that enables users to generate a desired geographical route between supplied locations.

Area Avoidance Navigation Systems

Unfortunately, commanders cannot rely on general-purpose navigation systems because they do not generate routes that avoid threats to soldiers in transit. Fortunately, several inventors have suggested systems that route around dangerous areas. For example:

U.S. Pat. No. 5,787,233 to Akimoto (1998) discloses a system that determines elevation gradients based on a topographical maps and generates routes that avoid areas that are two steep.

U.S. Pat. No. 5,850,617 to Libby (1998) discloses a system that directs satellites while avoiding routes that pass over obstructions such as clouds.

U.S. Pat. No. 6,298,302 to Walgers et al. (2001) discloses a system that directs traffic while taking accidents and other road conditions into account.

U.S. Pat. No. 6,401,038 to Gia (2002) discloses a system that analyzes topographical data and develops a flight plan that avoids collision.

Battlefield Navigation Systems

Even the systems that route around dangerous areas, however, do not take into account the specific threats to soldiers on the battlefield. Fortunately, a few inventors developed routing systems that take battlefield threats into account. For example:

U.S. Pat. No. 5,187,667 to Short (1993) discloses a system that generates routes that take into account concealment, cover, and line-of-sight.

U.S. Pat. No. 6,182,007 to Szczerba (2001) discloses a system that minimizes visibility to enemy sensors by taking a vehicle's aspect angle into account during route planning.

Guidance Systems

For soldiers to realize the benefit of a safe battlefield route, however, they require a means of receiving guidance along the route. Computer-implemented guidance systems provide directions and obviate the need for commanders to manually issue turn-by-turn directions. Several existing guidance systems provide the foundation for one designed for battlefield use. For example:

U.S. Pat. No. 5,612,882 to LeFebvre et al. (1997) discloses a system that guides a driver along roadways.

U.S. Pat. No. 6,144,318 to Hayashi et al. (2000) discloses a system that displays roads, buildings, and landmarks to assist with navigation guidance.

U.S. Pat. No. 6,317,684 to Roeseler et al. (2001) discloses a system that presents turn-by-turn directions via a telephone.

Prior Art Disadvantages

Today, commanders still rely on paper maps to generate routes by hand. In addition, commanders continue to issue turn-by-turn directions to soldiers on the battlefield. Existing navigation and guidance systems bring us closer to relieving commanders from these tasks, but they suffer from several disadvantages. Specifically, existing systems fail to:

a. Discover the range of enemy attacks. Existing systems do not consider the position and attack range of enemy units. As a result, soldiers are susceptible to surprise attacks by enemy units.

b. Discover battlefield obstacles. Existing systems do not fuse aerial imagery with road data to discover obstructions erected by the enemy. As a result, soldiers endure unnecessary risk and delays as they discover obstructions during combat.

c. Route around enemy attacks. Existing systems do not take into account enemy attacks when generating a route. As a result, soldiers face unnecessary enemy attacks en route.

d. Route around battlefield obstacles. Existing systems do not take into account obstacles erected by the enemy when generating a route. As a result, soldiers encounter impassable terrain en route.

e. Minimize energy expenditure across terrain. Existing systems do not take into account traversal speeds across various terrain types. As a result, soldiers miss shortcuts and waste energy passing through difficult terrain.

f. Ensure soldiers maintain their focus on the battlefield. Existing systems present a route using a list of directions or a map. As a result, reviewing the route distracts soldiers from the battlefield and exposes them to possible enemy attack.

SUMMARY OF INVENTION

Accordingly, the present invention has several advantages over the prior art. Specifically, the present invention:

a. Discovers the range of enemy attacks. The present invention combines information about the position and capabilities of an enemy unit to determine its range of attack.

b. Discovers battlefield obstacles. The present invention combines aerial imagery with road network data to discover obstructions erected by the enemy.

c. Routes around enemy attacks. The present invention cordons off areas within reach of enemy units and routes soldiers accordingly.

d. Routes around battlefield obstacles. The present invention prevents travel along roads obstructed by the enemy.

e. Minimizes energy expenditure across terrain. The present invention minimizes the energy expended by soldiers in transit by taking into account their speeds across various types of terrain.

f. Ensure soldiers maintain their focus on the battlefield. Modern soldiers are equipped with heads-up displays connected to weapon-mounted video cameras. The present invention provides real-time guidance by overlaying the route on live video in a soldier's heads-up display.

Further advantages of the present invention will become apparent from a consideration of the ensuing description and drawings.

The present invention is a computer-implemented method for generating and presenting off-road travel routes based on terrain and obstruction analysis. The invention thus includes a Threat Analyzer for analyzing threats, a Graph Builder for constructing a graph representing an individual's environment, a Route Generator for generating a route that avoids threats, and a Route Presenter for presenting the route to the individual.

The Threat Analyzer detects obstructions in aerial video.

The Graph Builder represents the individual's environment using a grid of connected nodes. Each node corresponds to a location in the environment. The edges connecting adjacent nodes represent axial or diagonal movement between locations. The Graph Builder assigns edge costs that represent the danger and difficulty of traversing the associated path.

The Route Generator creates a path from a source location to a destination location. The route reduces risk by avoiding obstructions. The Route Generator also minimizes energy expenditure along safe routes by taking into account the speeds at which individuals can traverse various types of terrain.

The Route Presenter ensures that individuals remain focused on their environment by overlaying the generated route on aerial imagery. The Route Presenter also labels waypoints that appear in the imagery to guide individuals to their destination.

DETAILED DESCRIPTION OF THE PREFERRED EMBODIMENTS

Figure 1:
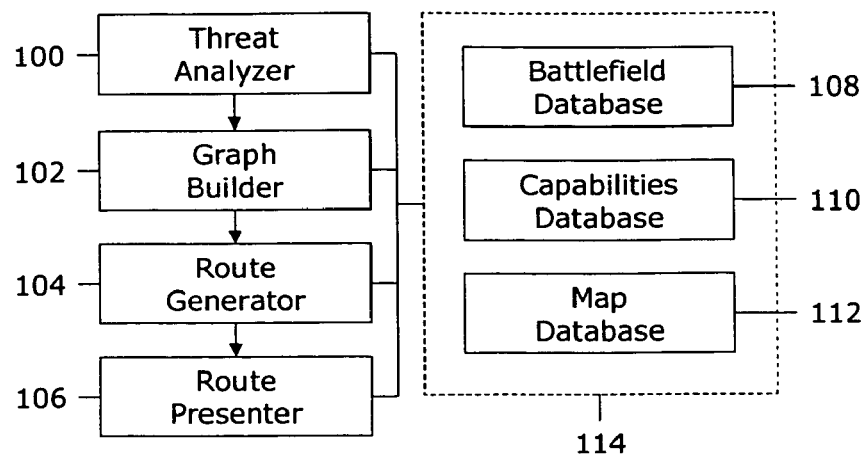
FIG. 1: Overall Method of Routing Soldiers Around Enemy Attacks And Battlefield Obstructions.

FIG. 1 shows a preferred embodiment of the present invention. The processing is performed by four components. The Threat Analyzer 100 analyzes threats posed by enemy units and battlefield obstructions. The Graph Builder 102 constructs a graph representing the battlefield. The graph consists of nodes and edges. Edge costs reflect the danger and difficulty of traversing the associated path. The Route Generator 104 generates an optimal route through the battlefield from a source node to a destination node. The Route Presenter 106 presents the route to a soldier as he or she traverses the battlefield.

Each of the components has access to a collection of databases 114. The Battlefield Database 108 contains the positions and descriptions of enemy units. The Capabilities Database 110 contains types of friendly and enemy units and their capabilities. The Map Database 112 contains geographic information including black and white aerial imagery and road vector data. The Map Database 112 is a standard Geographic Information System (GIS) such as MapInfo™ by ESRI, Inc. of Redlands, Calif.

The following sections describe the present invention's components in detail.

Threat Analyzer

Figure 2:
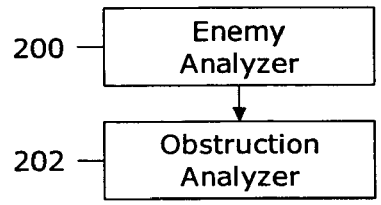
FIG. 2: Threat Analyzer.

FIG. 2 shows a preferred embodiment of the Threat Analyzer 100. The processing is performed by two components. The Enemy Analyzer 200 determines the attack range of enemy units and records that information in the Map Database 112. The Obstruction Analyzer 202 performs comparative analysis of aerial imagery to detect battlefield obstructions.

Enemy Analyzer

Figure 3:
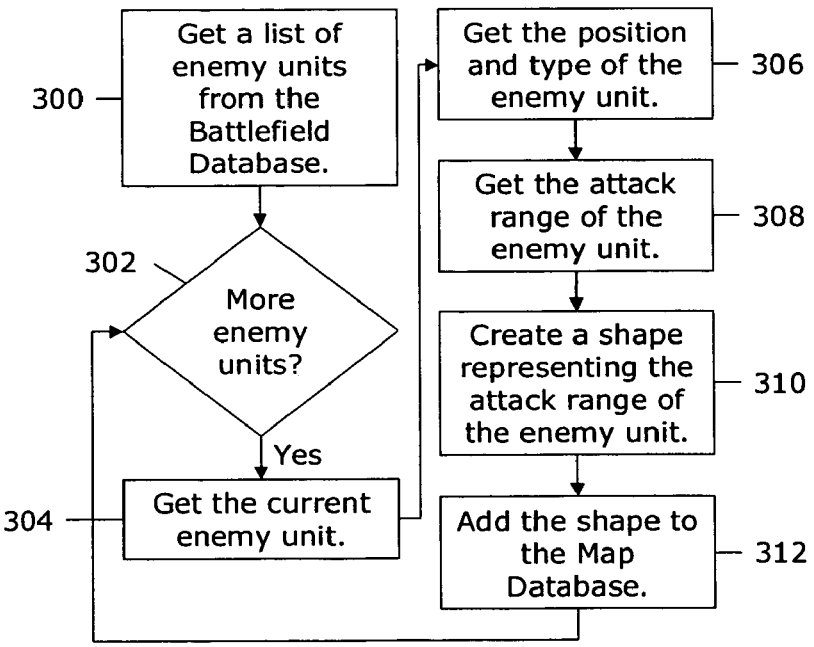
FIG. 3: Enemy Analyzer.

FIG. 3 shows a preferred embodiment of the Enemy Analyzer 200. The Enemy Analyzer 200 begins at step 300 by retrieving a list of enemy units from the Battlefield Database 108. At step 302, the Enemy Analyzer 200 proceeds if there is at least one enemy unit in the list. At step 304, the Enemy Analyzer 200 extracts the current enemy unit from the list. At step 306, the Enemy Analyzer 200 retrieves the enemy unit's position and type from the Battlefield Database 108. At step 308, the Enemy Analyzer 200 queries the Capabilities Database 110 for the attack range of enemy units with the specified type. At step 310, the Enemy Analyzer 200 creates a shape representing the attack range of the enemy unit. The shape is centered on the enemy unit's position and has a radius equal to the enemy unit's attack range. At step 312, the Enemy Analyzer 200 adds the shape to the Map Database 112. Finally, the Enemy Analyzer 200 returns to step 302, where it proceeds in analyzing the next enemy unit, if any remain. The Enemy Analyzer 200 continues until it has analyzed all enemy units included in the list retrieved at step 300.

Figure 4:
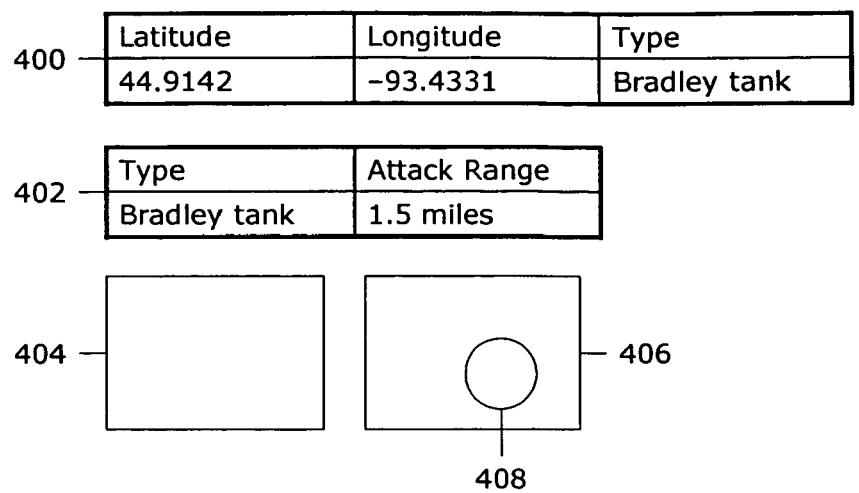
FIG. 4: Enemy Analyzer Example.

To better understand the Enemy Analyzer 200, consider the example in FIG. 4. The Enemy Analyzer 200 begins by retrieving the list 400 of enemy units from the Battlefield Database 108. In this case, the list 400 contains one enemy unit. The enemy unit is a Bradley tank at latitude 44.9142, longitude −93.4331. The Enemy Analyzer 200 continues by querying the Capabilities Database 110 to determine the attack range of the Bradley tank. The Capabilities Database 110 returns a record 402 indicating that the attack range is 1.5 miles. Next, the Enemy Analyzer 200 creates a shape 408 representing the enemy unit's attack range. The shape 408 is centered on latitude 44.9142, longitude −93.4331 and has a radius of 1.5 miles. Next, the Enemy Analyzer 200 retrieves a battlefield map 404 from the Map Database 112. Finally, the Enemy Analyzer 200 creates an updated battlefield map 406 by adding the shape 408 representing the enemy unit's attack range.

Obstruction Analyzer

Figure 5:
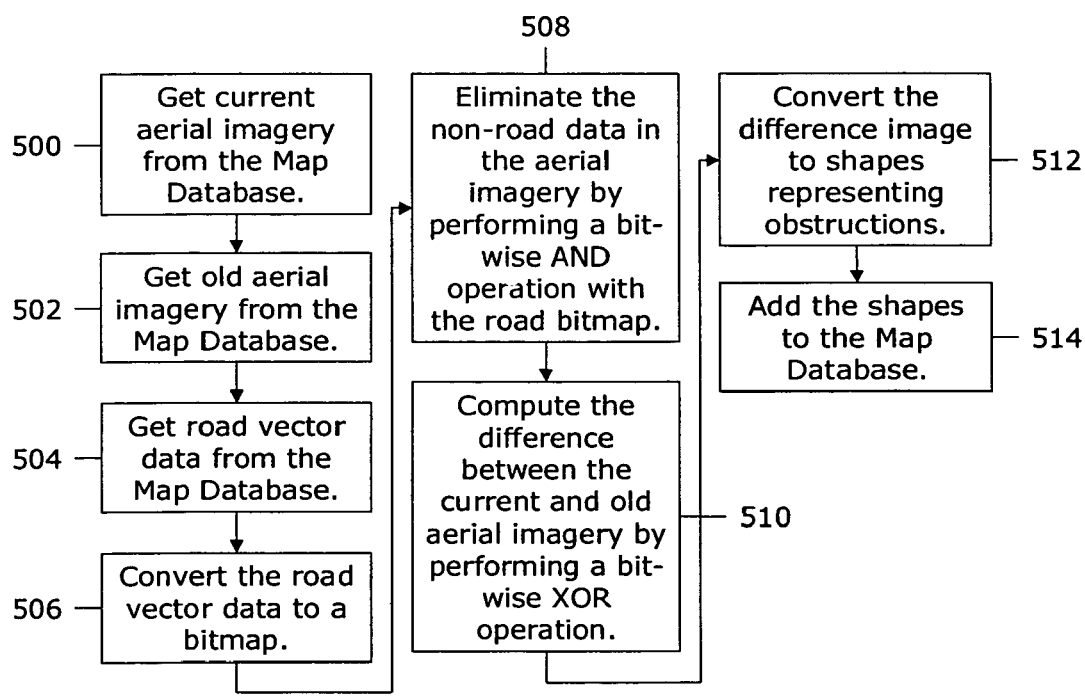
FIG. 5: Obstruction Analyzer.

FIG. 5 shows a preferred embodiment of the Obstruction Analyzer 202. The Obstruction Analyzer 202 begins at step 500 by retrieving current aerial imagery of the battlefield from the Map Database 112. At step 502, the Obstruction Analyzer 202, retrieves old aerial imagery of the battlefield for comparison. At step 504, the Obstruction Analyzer 202 retrieves vector data describing the roads covering the battlefield. At step 506, the Obstruction Analyzer 202 relies on the GIS capabilities of the Map Database 112 to convert the road vector data to a bitmap that matches the dimensions and resolution of the aerial imagery. At step 508, the Obstruction Analyzer 202 eliminates the non-road data from the aerial imagery by performing a bit-wise AND operation with the road bitmap. After performing the bit-wise AND operation, only areas representing roads remain in the aerial imagery. At step 510, the Obstruction Analyzer 202 computes the difference between the current and old aerial imagery by performing a bit-wise XOR operation. The regions in the resulting bitmap represent changes along the roads. These changes may result from the placement of battlefield obstructions. At step 512, the Obstruction Analyzer 202 relies on the GIS capabilities of the Map Database 112 to convert the difference image to shapes representing obstructions. Finally, at step 514, the Obstruction Analyzer 202 adds the shapes representing obstructions to the Map Database 112.

Figure 6:
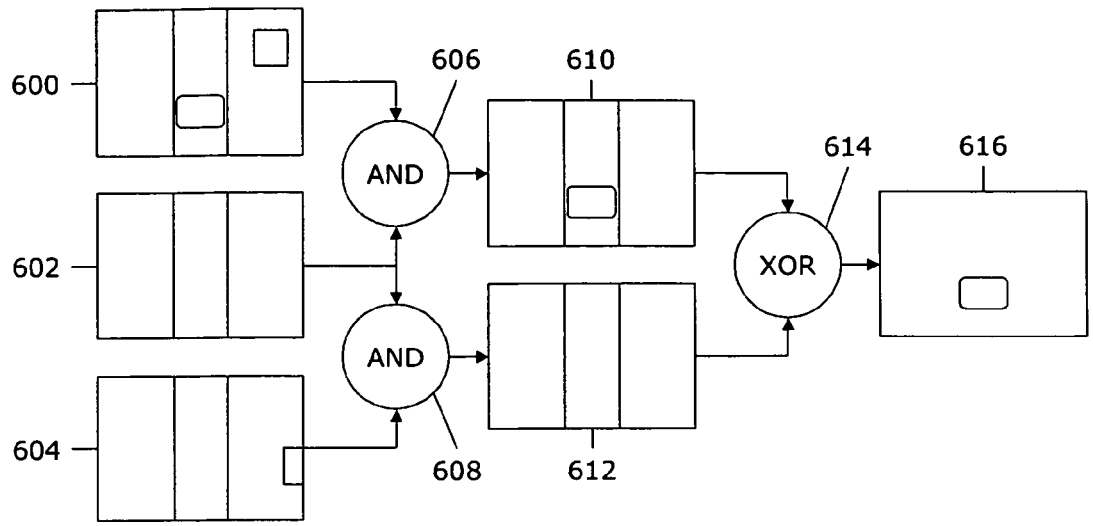
FIG. 6: Obstruction Analyzer Example.

To better understand the Obstruction Analyzer 202, consider the example in FIG. 6. The Obstruction Analyzer 202 begins by retrieving current aerial imagery 600 from the Map Database 112. Next, the Obstruction Analyzer 202 retrieves old aerial imagery 604 from the Map Database 112. The Obstruction Analyzer 202 limits obstruction analysis to roads. Therefore, the Obstruction Analyzer 202 proceeds by retrieving vector data representing the road network. Next, the Obstruction Analyzer 202 uses the GIS capabilities of the Map Database 112 to convert the road vector data to a road bitmap 602. Next, the Obstruction Analyzer 202 combines the current aerial imagery 600 with the road bitmap 602 using a bit-wise AND operation 606. The result is a current road bitmap 610 containing just the roads within current aerial imagery 600. In addition, the Obstruction Analyzer 202 combines the old aerial imagery 604 with the road bitmap 602 using a bit-wise AND operation 608. The result is an old road bitmap 612 containing just the roads within old aerial imagery 604. Next, the Obstruction Analyzer 202 combines the current road bitmap 610 with the old road bitmap 612 using a bit-wise XOR operation 614 to produce a difference image 616. These differences may be obstructions recently erected by the enemy. Using the GIS capabilities of the Map Database 112, the Obstruction Analyzer 202 converts the difference image 616 into shapes representing obstructions. Finally, the Obstruction Analyzer 202 adds the shapes representing obstructions to the Map Database 112.

Graph Builder

Figure 7:
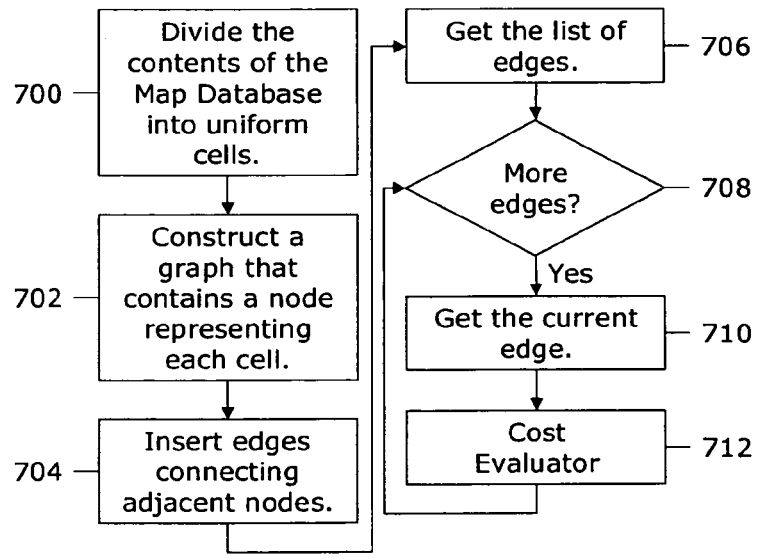
FIG. 7: Graph Builder.

FIG. 7 shows a preferred embodiment of the Graph Builder 102. The Graph Builder 102 begins at step 700 by retrieving the battlefield map from the Map Database 112 and dividing it into uniform cells. At step 702, the Graph Builder 102 constructs a grid with each cell represented by one node. At step 704, the Graph Builder 102 inserts edges to connect each adjacent node in the graph. At step 706, the Graph Builder 102 retrieves the list of these edges. At step 708, the Graph Builder 102 proceeds if there is at least one edge in the list. At step 710, the Graph Builder 102 extracts the current edge from the list. Next, the Graph Builder 102 invokes the Cost Evaluator 712 to set the edge cost. A high edge cost indicates that it may be dangerous or difficult to traverse the edge. Finally, the Graph Builder 102 returns to step 708, where it proceeds to assign a cost to the next edge, if any remain. The Graph Builder 102 continues assigning edge costs until there are no edges remaining in the list retrieved at step 706.

Figure 8:
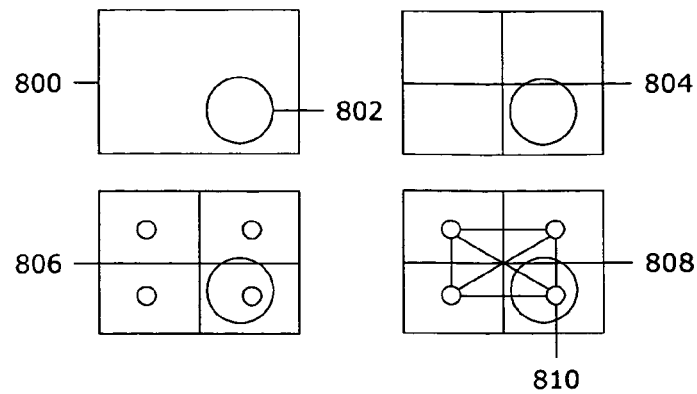
FIG. 8: Graph Builder Example.

To better understand the Graph Builder 102, consider the example in FIG. 8. The Graph Builder 102 begins by retrieving the battlefield map 800 from the Map Database 112. In this case, the battlefield map 800 contains an obstruction 802 in the bottom-right corner. Next, the Graph Builder 102 divides the battlefield map 800 into a grid 804 of uniform cells. Next, the Graph Builder 102 constructs a graph 806 that contains a node representing each cell. Next, the Graph Builder 102 creates a connected graph 808 by inserting edges between adjacent nodes. Next, the Graph Builder 102 retrieves the list of the edges. The Graph Builder 102 assigns a cost to each edge using the Cost Evaluator 712. The Cost Evaluator 712 assigns a high cost to edges connected to the bottom-right node 810. The high cost represents the difficulty of reaching the node due to the obstruction 802.

Cost Evaluator

Figure 9:
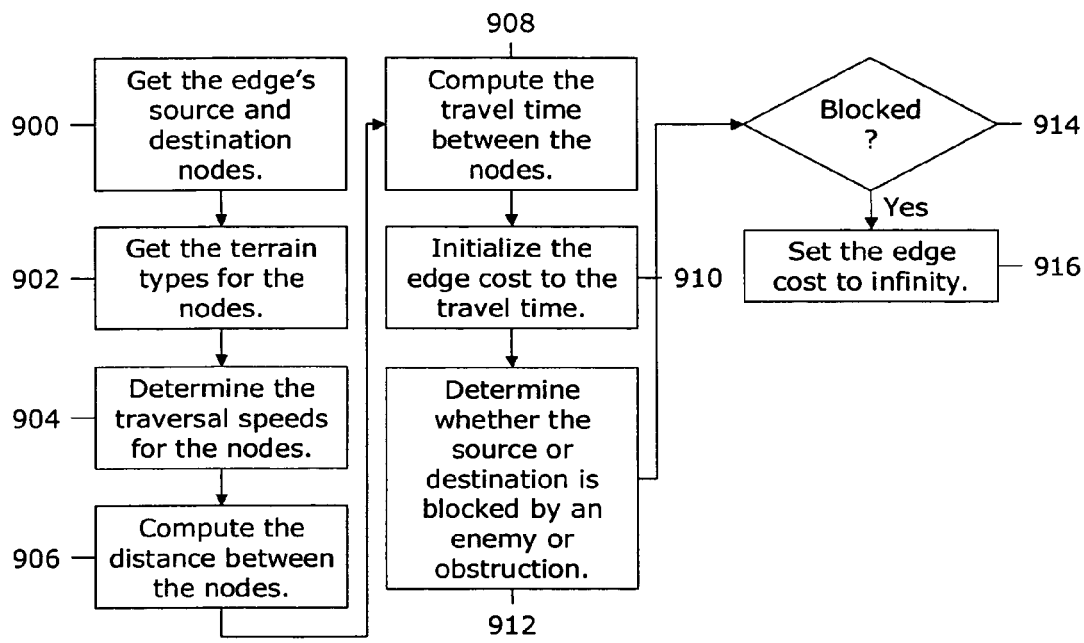
FIG. 9: Cost Evaluator.

FIG. 9 shows a preferred embodiment of the Cost Evaluator 712. The Cost Evaluator 712 begins at step 900 by retrieving the source and destination nodes at either end of the input edge. At step 902, the Cost Evaluator 712 queries the Map Database 112 to retrieve the terrain type associated with each of the nodes. At step 904, the Cost Evaluator 712 queries the Capabilities Database 110 to retrieve the traversal speeds for the soldier across these types of terrain. At step 906, the Cost Evaluator 712 computes the distance between the nodes using the following equation:

$$\text{Distance} = ((\text{Source Latitude} - \text{Destination Latitude})^2 + (\text{Source Longitude} - \text{Destination Longitude})^2)^{(1/2)}$$

At step 908, the Cost Evaluator 712 computes the travel time between the nodes using the following equation:

Travel Time=Distance/2/(Source Speed+Destination Speed)

At step 910, the Cost Evaluator 712 initializes the edge cost to the travel time. At step 912, the Cost Evaluator 712 uses the GIS capabilities of the Map Database 112 to determine whether an enemy or obstruction blocks either node. The Map Database 112 determines whether the shapes created by the Enemy Analyzer 200 and Obstruction Analyzer 202 overlap the positions associated with the source or destination nodes. At step 914, the Cost Evaluator 712 proceeds if an enemy or obstruction blocks either node. If either node is blocked, the Cost Evaluator 712 assigns an infinite edge cost at step 916.

Figure 10:
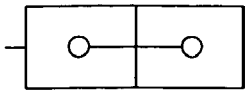
FIG. 10: Cost Evaluator Example.
Figure 11:
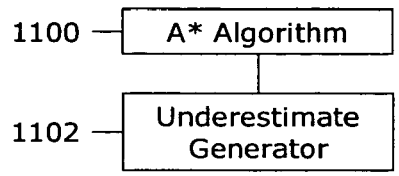
FIG. 11: Route Generator.

To better understand the Cost Evaluator 712, consider the example in FIG. 10. The input to the Cost Evaluator 712 is an edge 1000 connecting adjacent nodes. The Cost Evaluator 712 begins by querying the Map Database 112 to retrieve a table 1002 describing the nodes. The table 1002 indicates that the source node is located at latitude 44.9142, longitude −93.4331 and the destination node is located at latitude 44.9318, longitude −93.4331. In addition, the table 1002 indicates that the source node is located in a field whereas the destination node is located in a jungle. An enemy or obstruction blocks neither node. Next, the Cost Evaluator 712 queries the Capabilities Database 110 to determine the traversal speeds across fields and jungle. The Capabilities Database 110 returns a table 1004 indicating that the traversal speed across fields is 4 mph and the traversal speed across jungle is 1 mph. Next, the Cost Evaluator 712 computes the distance between the source and destination nodes as follows:

Distance=((44.9142−44.9318)^2+(−93.4331−−93.4331)^2)^(1/2)=0.0176

Next, the Cost Evaluator 712 computes the travel time between the nodes. For this example, the Cost Evaluator 712 converts the traversal speeds to the appropriate units using the approximation that there are 69.1 miles per unit of latitude or longitude. Therefore, the Cost Evaluator 712 estimates the travel time as follows:

Travel Time=0.0176/2/(4/69.1+1/69.1)=0.121616

Next, the Cost Evaluator 712 initializes the edge cost to the travel time. Next, the Cost Evaluator 712 uses the GIS capabilities of the Map Database 112 to determine whether an enemy or obstruction blocks the source or destination. In the example, neither of the nodes is blocked, so the Cost Evaluator 712 terminates.

Route Generator

FIG. 9 shows a preferred embodiment of the Route Generator 104. The Route Generator 104 uses the A* algorithm 1100 to find an optimal path from a source node to a destination node. The A* algorithm 1100 is well known to those skilled in the art, so it will not be described herein. Instead, please refer to Chapter 5 of the book "Artificial Intelligence, Third Edition" by Patrick Henry Winston, published by Addison-Wesley, which is incorporated herein by reference.

In order for the A* algorithm 1100 to operate efficiently, it requires an Underestimate Generator 1102 that quickly estimates a lower bound on the cost of traveling from a given source node to a given destination node. The Underestimate Generator 1102 used in the present invention is described below.

Underestimate Generator

Figure 12:
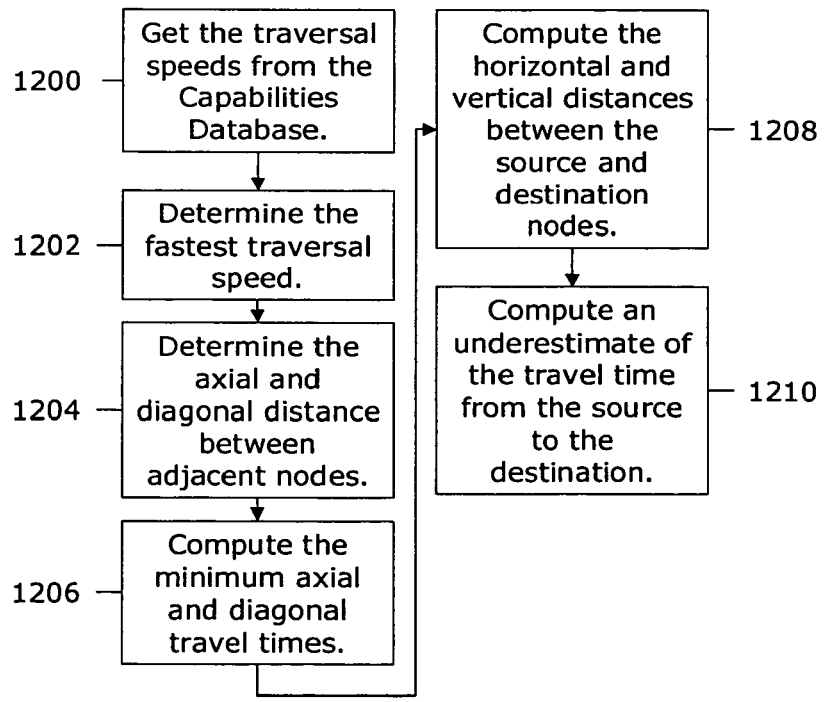
FIG. 12: Underestimate Generator.

FIG. 12 shows a preferred embodiment of the Underestimate Generator 1102. The Underestimate Generator 1102 begins at step 1200 by retrieving a list of traversal speeds from the Capabilities Database 110. At step 1202, the Underestimate Generator 1102 retrieves the fastest traversal speed from the list. At step 1204, the Underestimate Generator 1102 computes the axial and diagonal distances between adjacent nodes using the following equations:

Axial Distance=Cell Width

Diagonal Distance=(Cell Width^2+Cell Width^2)^(1/2)

At step 1206, the Underestimate Generator 1102 computes the minimum axial and diagonal traversal times using the following equations:

Minimum Axial Traversal Time=Axial Distance/Fastest Traversal Speed

Minimum Diagonal Traversal Time=Diagonal Distance/Fastest Traversal Speed

At step 1208, the Underestimate Generator 1102 computes the horizontal and vertical distance between the source and destination nodes using the following equations:

Horizontal Distance=Absolute Value(Source Column−Destination Column)

Vertical Distance=Absolute Value(Source Row−Destination Row)

At step 1210, the Underestimate Generator 1102 computes an underestimate of the traversal time from the source to the destination using the following equation:

Minimum Traversal Time=Minimum Axial Traversal Time*Absolute Value(Horizontal Distance−Vertical Distance)+Minimum Diagonal Traversal Time*Minimum(Horizontal Distance,Vertical Distance)

Figure 13:
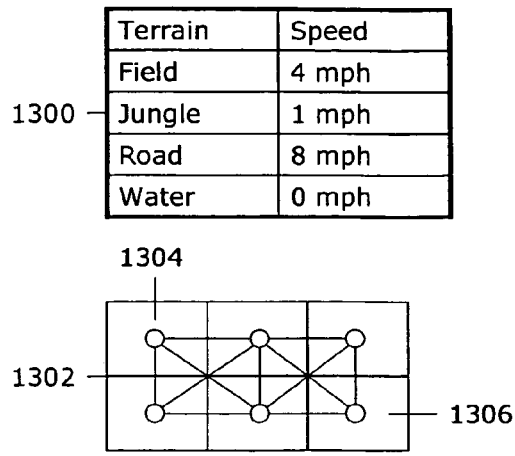
FIG. 13: Underestimate Generator Example.

To better understand the Underestimate Generator 1102, consider the example in FIG. 13. The Underestimate Generator 1102 begins by retrieving a list 1300 of traversal speeds from the Capabilities Database 110. Next, the Underestimate Generator 1102 searches the list 1300 for the fastest traversal speed. In this case, it is the 8 mph traversal speed across roads. Next, the Underestimate Generator 1102 determines the axial and diagonal distances between adjacent nodes. For this example, the Underestimate Generator 1102 assumes that the Graph Builder 102 divided the battlefield map into uniform cells with a width of 0.0176. The Underestimate Generator 1102 determines the axial and diagonal distances as follows:

Axial Distance=0.0176

Diagonal Distance=(0.0176^2+0.0176^2)(1/2)=0.0249

Next, the Underestimate Generator 1102 computes the minimum axial and diagonal traversal times. For this example, the Underestimate Generator 1102 converts the traversal speeds to the appropriate units using the approximation that there are 69.1 miles per unit of latitude or longitude. The Underestimate Generator 1102 computes the minimum axial and diagonal traversal times as follows:

Minimum Axial Traversal Time=0.0176(8/69.1)
=0.15202

Minimum Diagonal Traversal Time=0.0249/(8/69.1)
=0.21507375

The graph 1302 operated on by the Underestimate Generator 1102 contains six nodes arranged into two rows and three columns. The source node 1304 is in the first row and first column. The destination node 1306 is in the second row and third column. Next, the Underestimate Generator 1102 computes the horizontal and vertical distance between the source node 1304 and destination node 1306 as follows:

Horizontal Distance=Absolute Value(1−3)=2

Vertical Distance=Absolute Value(1−2)=1

Next, the Underestimate Generator 1102 computes an underestimate of the traversal time from the source node 1304 and destination node 1306 as follows:

Minimum Traversal Time=0.15202*Absolute Value (2−1)+0.21507375*Minimum(2,1)=0.15202*1+ 0.21507375*1=0.36709375

Route Presenter

A modern soldier is equipped with a heads-up display connected to a weapon-mounted video camera. The solider also wears a GPS receiver for tracking position and a compass for determining orientation. The Route Presenter 106 retrieves information generated by the soldier's equipment from the Battlefield Database 108.

Figure 14:
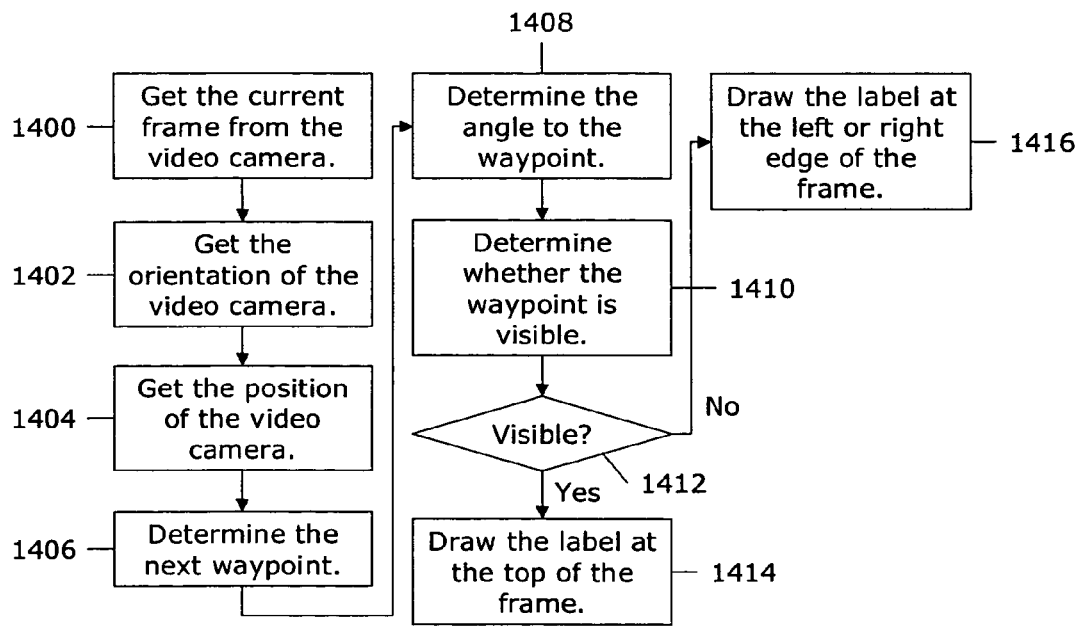
FIG. 14: Route Presenter.

FIG. 14 shows a preferred embodiment of the Route Presenter 106. The Route Presenter 106 begins at step 1400 by querying the Battlefield Database 108 to retrieve a bitmap representing the current frame of video from the soldier's weapon-mounted video camera. At step 1402, the Route Presenter 106 retrieves the soldier's orientation from the Battlefield Database 108. At step 1404, the Route Presenter 106 retrieves the soldier's position from the Battlefield Database 108. At step 1406, the Route Presenter 106 determines the next waypoint. It does so by retrieving the list of waypoints from the Map Database 112, eliminating any within a fixed distance of the soldier, and selecting the first remaining waypoint. The first remaining waypoint is the next one because the Route Generator 104 initially orders the waypoints along the optimal path from the source to the destination. At step 1408, the Route Presenter 106 determines the angle from the soldier to the waypoint using the following equation:

Waypoint Angle=Arc Tangent(Soldier Longitude− Waypoint Longitude,Soldier Latitude−Waypoint Latitude)

At step 1410, the Route Presenter 106 determines whether the waypoint is visible. The inequality for determining visibility involves the weapon-mounted video camera's field of view. Typically, a video camera's field of view is 160 degrees. The Route Presenter 106 determines whether the waypoint is visible using the following inequality:

If(Waypoint Angle−Orientation<Field of View/2)

Waypoint is visible

Else

Waypoint is not visible

Depending on the waypoint's visibility, the Route Presenter 106 branches at step 1412. If the waypoint is visible, the Route Presenter 106 proceeds to step 1414 and draws a waypoint label at the top of the video frame bitmap. In this case, the Route Presenter 106 determines the horizontal position of the waypoint label using the following equation:

Horizontal Position=Frame Width/2+Frame Width* (Waypoint Angle−Orientation)/Field of View Otherwise, if the waypoint is not visible, the Route Presenter 106 proceeds to step 1416 and draws a waypoint label at the left or right edge of the frame. In this case, the Route Presenter 106 determines the appropriate edge using the following inequality:

If(Waypoint Angle−Orientation>0)

Waypoint appears to the right

Else

Waypoint appears to the left

Figure 15:
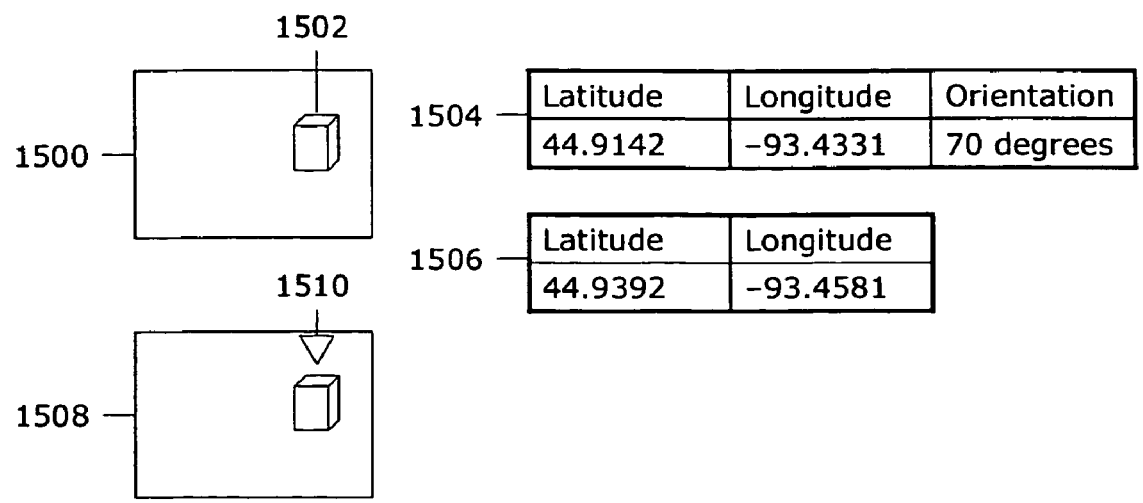
FIG. 15: Route Presenter Example.

To better understand the Route Presenter 106, consider the example in FIG. 15. The Route Presenter 106 begins by querying the Battlefield Database 108 to retrieve a bitmap 1500 representing the current frame of video from the soldier's weapon-mounted video camera. For this example, a building 1502 appearing in the bitmap 1500 corresponds to the next waypoint. Next, the Route Presenter 106 retrieves a record 1504 from the Battlefield Database 108 indicating the soldier's position and orientation. Next, the Route Presenter 106 gets the list of waypoints from the Map Database 112. The Route Presenter 106 removes any waypoints that are within a fixed distance of the soldier's current position. The waypoints are stored in order from the source to the destination, so the first remaining waypoint is the next waypoint 1506. Next, the Route Presenter 106 determines the angle from the soldier to the next waypoint as follows:

Waypoint Angle=Arc Tangent(−93.4331−−93.4581, 44.9142−44.9392)=Arc Tangent(0.025,−0.025) =135 degrees The Battlefield Database 108 indicated that the soldier's orientation is 70 degrees. As a result, we can use the following inequality to determine whether the next waypoint 1506 is within the video camera's 160-degree field of view:

If(135−70<160/2)

Waypoint is visible

Else

Waypoint is not visible

The inequality shows that the next waypoint 1506 is therefore visible. Next, the Route Presenter 106 determines the horizontal position for the waypoint label. Assuming that the bitmap 1500 representing the current frame has a resolution of 640 by 480 pixels, the Route Presenter 106 computes the horizontal position as follows:

Horizontal Position=640/2+640*(135−70)160=580

Finally, the Route Presenter 106 creates an updated bitmap 1508 representing the current video frame by drawing a waypoint label 1510. The Route Presenter 106 draws the waypoint label 1510 at the top of the updated bitmap 1508, horizontally centered at the position computed above.

What is claimed is:

1. A computer-implemented method for electronically generating and presenting a travel route, the method comprising:
   electronically identifying threats that impede progress,
   electronically generating a route that avoids said threats,
   electronically presenting said route,
   electronically retrieving the position of a traveler,
   electronically retrieving the orientation of said traveler,
   electronically retrieving the position of a waypoint along said route,
   electronically determining the angle between said traveler and said waypoint, relative to said orientation of said traveler, and
electronically indicating said angle to said traveler.

2. The computer-implemented method of claim 1 wherein electronically indicating said angle to said traveler includes:
- electronically retrieving a frame from a video camera associated with said traveler,
- electronically determining the field of view of said video camera,
- electronically determining the visibility of said waypoint,
- electronically determining only the horizontal position in said frame corresponding to said waypoint, and
- electronically indicating to said traveler the presence of said waypoint in said frame at only said horizontal position.

3. The computer-implemented method of claim 1 wherein said method is implemented by one or more hardware or software devices.

4. A computer program product for electronically generating and presenting a travel route and including one or more computer-readable instructions embedded on a computer-readable medium and configured to cause one or more computer processors to perform the steps of:
- electronically identifying threats that impede progress,
- electronically generating a route that avoids said threats,
- electronically presenting said route,
- electronically retrieving the position of a traveler,
- electronically retrieving the orientation of said traveler,
- electronically retrieving the position of a waypoint along said route,
- electronically determining the angle between said traveler and said waypoint, relative to said orientation of said traveler, and
- electronically indicating said angle to said traveler.

5. The computer program product of claim 4 wherein electronically indicating said angle to said traveler includes:
- electronically retrieving a frame from a video camera associated with said traveler,
- electronically determining the field of view of said video camera,
- electronically determining the visibility of said waypoint,
- electronically determining only the horizontal position in said frame corresponding to said waypoint, and
- electronically indicating to said traveler the presence of said waypoint in said frame at only said horizontal position.

* * * * *